(12) United States Patent
Luo et al.

(10) Patent No.: US 12,365,086 B2
(45) Date of Patent: Jul. 22, 2025

(54) TECHNIQUES FOR FORCE AND TORQUE-GUIDED ROBOTIC ASSEMBLY

(71) Applicant: AUTODESK, INC., San Francisco, CA (US)

(72) Inventors: Jieliang Luo, San Bruno, CA (US); Hui Li, San Rafael, CA (US)

(73) Assignee: AUTODESK, INC., San Francisco, CA (US)

( * ) Notice: Subject to any disclaimer, the term of this patent is extended or adjusted under 35 U.S.C. 154(b) by 364 days.

(21) Appl. No.: 17/471,520

(22) Filed: Sep. 10, 2021

(65) Prior Publication Data

US 2022/0105626 A1    Apr. 7, 2022

Related U.S. Application Data

(60) Provisional application No. 63/087,841, filed on Oct. 5, 2020.

(51) Int. Cl.
*B25J 9/16* (2006.01)
*G05B 13/02* (2006.01)

(52) U.S. Cl.
CPC .............. *B25J 9/1633* (2013.01); *B25J 9/163* (2013.01); *G05B 13/0265* (2013.01)

(58) Field of Classification Search
CPC ........ B25J 9/1633; B25J 9/163; B25J 9/1687; B25J 9/1679; B25J 9/1656; B25J 9/1697;
(Continued)

(56) References Cited

U.S. PATENT DOCUMENTS

2020/0197108 A1\* 6/2020 Usui ...................... A61B 34/37
2020/0334567 A1\* 10/2020 Bhattacharjee ....... H04L 67/125
(Continued)

FOREIGN PATENT DOCUMENTS

EP        3 319 016 A1    5/2018
JP       2019-529135 A    10/2019
(Continued)

OTHER PUBLICATIONS

Song et al., "Skill Learning for Robotic Assembly based on Visual Perspectives and Force Sensing", Robotics and Autonomous Systems, vol. 135, Sep. 28, 2020, 13 pages (Year: 2020).\*
(Continued)

*Primary Examiner* — Basil T. Jos
*Assistant Examiner* — Elizabeth Rose Neleski
(74) *Attorney, Agent, or Firm* — Artegis Law Group, LLP (57) ABSTRACT

Techniques are disclosed for training and applying machine learning models to control robotic assembly. In some embodiments, force and torque measurements are input into a machine learning model that includes a memory layer that introduces recurrency. The machine learning model is trained, via reinforcement learning in a robot-agnostic environment, to generate actions for achieving an assembly task given the force and torque measurements. During training, experiences are collected as transitions within episodes, the transitions are grouped into sequences, and the last two sequences of each episode have a variable overlap. The collected transitions are stored in a prioritized sequence replay buffer, from which a learner samples sequences to learn from based on transition and sequence priorities. Once trained, the machine learning model can be deployed to control various types of robots to perform the assembly task based on force and torque measurements acquired by sensors of those robots.

19 Claims, 7 Drawing Sheets

(58) Field of Classification Search
CPC .... B25J 19/007; G05B 13/0265; G05B 17/02; G05B 2219/39271; G05B 2219/40033; G05B 2219/40499; G06N 20/00

See application file for complete search history.

(56) References Cited

U.S. PATENT DOCUMENTS

| | | | |
|---|---|---|---|
| 2021/0201156 A1* | 7/2021 | Hafner | G06N 3/006 |
| 2021/0362330 A1* | 11/2021 | Kolluri | G05B 19/423 |
| 2022/0101064 A1* | 3/2022 | Kompella | G06N 20/00 |

FOREIGN PATENT DOCUMENTS

| | | |
|---|---|---|
| WO | 2018/053187 A1 | 3/2018 |
| WO | 2018/146769 A1 | 8/2018 |
| WO | 2019/222745 A1 | 11/2019 |
| WO | 2020/138436 A1 | 7/2020 |

OTHER PUBLICATIONS

Ferigo et al., "Gym-Ignition: Reproducible Robotic Simulations for Reinforcement Learning" Proceedings of the 2020 IEEE/SICE, Jan. 12-15, 2020 (Year: 2020).*

Horgan et al., "Distributed Prioritized Experience Replay", Published as a conference paper at ICLR 2018, arXiv:1803.00933, Mar. 2, 2018, 19 pages.

Schaul et al., "Prioritized Experience Replay", arXiv:1511.05952, Nov. 18, 2015, 23 pages.

Zhu et al., "The Ingredients of Real-World Robotic Reinforcement Learning", arXiv:2004.12570, Apr. 27, 2020, 20 pages.

Andrychowicz et al., "Learning Dexterous In-Hand Manipulation", DOI: 10.1177/0278364919887447, The International Journal of Robotics Research 2020, vol. 39, No. 1, 2020, pp. 3-20.

Schoettler et al., "Deep Reinforcement Learning for Industrial Insertion Tasks with Visual Inputs and Natural Rewards", arXiv:1906.05841, Jun. 13, 2019, 8 pages.

Akkaya et al., "Solving Rubik's Cube with a Robot Hand", arXiv:1910.07113, Oct. 17, 2019, 51 pages.

Luo et al., "Dynamic Experience Replay", 3rd Conference on Robot Learning, arXiv:2003.02372, Mar. 4, 2020, 10 pages.

Barth-Maron et al., "Distributed Distributional Deterministic Policy Gradients", in 6th International Conference on earning Representations, arXiv:1804.08617, Apr. 23, 2018, 16 pages.

Lillicrap et al., "Continuous Control with Deep Reinforcement Learning", In 6th International Conference on Learning Representations, arXiv:1509.02971, 2016, 14 pages.

Heess et al., "Memory-Based Control with Recurrent Neural Networks", arXiv:1512.04455, Dec. 14, 2015, 11 pages.

Schulman et al., "Proximal Policy Optimization Algorithms", arXiv:1707.06347, Aug. 28, 2017, 12 pages.

Mnih et al., "Human-Level Control through Deep Reinforcement Learning", doi: 10.1038/nature14236, vol. 518, Feb. 26, 2015, pp. 529-533.

Espeholt et al., "IMPALA: Scalable Distributed Deep-RL with Importance Weighted Actor-Learner Architectures", Proceedings of the 35th International Conference on Machine Learning, arXiv:1802.01561, 2018, 10 pages.

Fan et al., "A Learning Framework for High Precision Industrial Assembly", arXiv:1809.08548, Sep. 23, 2018, 7 pages.

Levine et al., "Guided Policy Search", Proceedings of the 30th International Conference on Machine Learning, 2013, 9 pages.

Sutton et al., "Reinforcement Learning: An Introduction", Second Edition, The MIT Press, 2018, 548 pages.

Luo et al., "Reinforcement Learning on Variable Impedance Controller for High-Precision Robotic Assembly", arXiv:1903.01066, Mar. 20, 2019, 8 pages.

Todorov et al., "A Generalized Iterative LQG Method for Locally-Optimal Feedback Control of Constrained Nonlinear Stochastic Systems", In Proceedings of the American Control Conference 2005, IEEE, 2005, 7 pages.

Apolinarska et al., "Robotic Assembly of Timber Joints using Reinforcement Learning", https://doi.org/10.1016/j.autcon.2021.103569, Automation in Construction Journal, vol. 125, 2021, 8 pages.

Hausknecht et al., "Deep Recurrent Q-Learning for Partially Observable MDPs", In 2015 AAAI Fall Symposium Series, 2015, pp. 29-37.

Kapturowski et al., "Recurrent Experience Replay in Distributed Reinforcement Learning", In International conference on learning representations, 2018, 19 pages.

Andrychowicz et al., "Learning Dexterous In-Hand Manipulation", The International Journal of Robotics Research, arXiv:1808.00177, Aug. 1, 2018, 27 pages.

Inoue et al., "Deep Reinforcement Learning for High Precision Assembly Tasks", In 2017 IEEE/RSJ International Conference on Intelligent Robots and Systems, IEEE, arXiv:1708.04033, Sep. 22, 2017, 7 pages.

Werbos, Paul J., "Backpropagation through Time: What it Does and How to Do it", Proceedings of the IEEE, vol. 78, No. 10, Oct. 1990, pp. 1550-1560.

Jaderberg et al., "Population Based Training of Neural Networks", arXiv:1711.09846, Nov. 28, 2017, 21 pages.

Extended European Search Report for Application No. 21199638.4 dated Feb. 25, 2022, 14 pages.

Song et al., "Skill Learning for Robotic Assembly based on Visual Perspectives and Force Sensing", Robotics and Autonomous Systems, vol. 135, Sep. 28, 2020, 13 pages.

Haarnoja et al., "Composable Deep Reinforcement Learning for Robotic Manipulation", 2018 IEEE International Conference on Robotics and Automation, May 21-25, 2018, pp. 6244-6251.

Coumans, E. and Bai, Y., "Pybullet, a python module for physics simulation for games, robotics and machine learning," GitHub repository, 2016. https://github.com/bulletphysics/bullet3, 6 pages.

\* cited by examiner

TECHNIQUES FOR FORCE AND TORQUE-GUIDED ROBOTIC ASSEMBLY

CROSS-REFERENCE TO RELATED APPLICATIONS

This application claims priority benefit of the U.S. Provisional Patent Application titled, "RECURRENT DISTRIBUTED REINFORCEMENT LEARNING FOR PARTIALLY OBSERVABLE ROBOTIC ASSEMBLY," filed on Oct. 5, 2020 and having Ser. No. 63/087,841. The subject matter of this related application is hereby incorporated herein by reference.

BACKGROUND

Field of the Disclosure

Embodiments of the present disclosure relate generally to robotics and, more specifically, to techniques for force and torque-guided robotic assembly.

Description of the Related Art

Robotic systems have been widely used to assemble products and perform tasks in manufacturing environments that can be precisely controlled, which ensures that the robots operating in those environments are able to perform tasks in a predictable and repetitive manner. However, many environments, such as architectural construction sites, are not or cannot be precisely controlled, which requires the robots operating in those environments to perform tasks under diverse and sometimes unpredictable circumstances. These latter types of environments are referred to herein as "unstructured" environments.

While traditional robot control techniques cannot adapt to the diversity and uncertainty in unstructured environments, such as misalignments in the initial poses of a robot or physical noises, reinforcement learning-based techniques have proven to be more successful at controlling robots in unstructured environments. However, in order to control a robot to perform complex tasks in an unstructured environment, conventional learning-based techniques require as inputs the pose of the robot and/or other objects in the environment, which can be captured directly via a motion capture or other tracking system, or inferred indirectly via a vision-based system.

One drawback of using motion capture or other tracking systems is that such systems are difficult to calibrate and deploy in many environments, including architectural construction sites. One drawback of using vision-based systems is that, in the contact-rich phase of assembly in an unstructured environment, during which assembly pieces are oftentimes in close contact with each other, vision-based systems can be negatively affected by occlusion and poor lighting conditions. As a result, conventional learning-based techniques for controlling robots that require the pose of a robot and/or other objects in an environment to be captured via a motion capture or other tracking system, or inferred indirectly via a vision-based system, have limited real-world utility. Another drawback of conventional learning-based techniques for controlling robots is that such techniques are robot specific and cannot readily generalize to other robotic platforms.

As the foregoing illustrates, what is needed in the art are more effective techniques for controlling robots in unstructured environments.

SUMMARY

One embodiment of the present disclosure sets forth a computer-implemented method for controlling a robot. The method includes receiving sensor data associated with the robot, where the sensor data comprises at least one of force or torque data. The method further includes applying a machine learning model to the sensor data to generate an action, where the machine learning model is trained via reinforcement learning. In addition, the method includes causing the robot to perform one or more movements based on the action.

Other embodiments of the present disclosure include, without limitation, a computer-readable medium including instructions for performing one or more aspects of the disclosed techniques as well as a computing device for performing one or more aspects of the disclosed techniques.

One technical advantage of the disclosed techniques relative to the prior art is that, with the disclosed techniques, a machine learning model can be trained to control a robot to perform an assembly task in an unstructured environment, without requiring as inputs the pose of a robot and/or other objects in the environment that need to be captured via a motion capture or other tracking system, or inferred indirectly via a vision-based system. In addition, with the disclosed techniques, the policies learned during training are robot-agnostic, which enables those policies to be used to control various types of robots. These technical advantages represent one or more technological advancements over prior art approaches.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

DETAILED DESCRIPTION

In the following description, numerous specific details are set forth to provide a more thorough understanding of the present disclosure. However, it will be apparent to one of skilled in the art that the present disclosure may be practiced without one or more of these specific details.

System Overview

Figure 1:
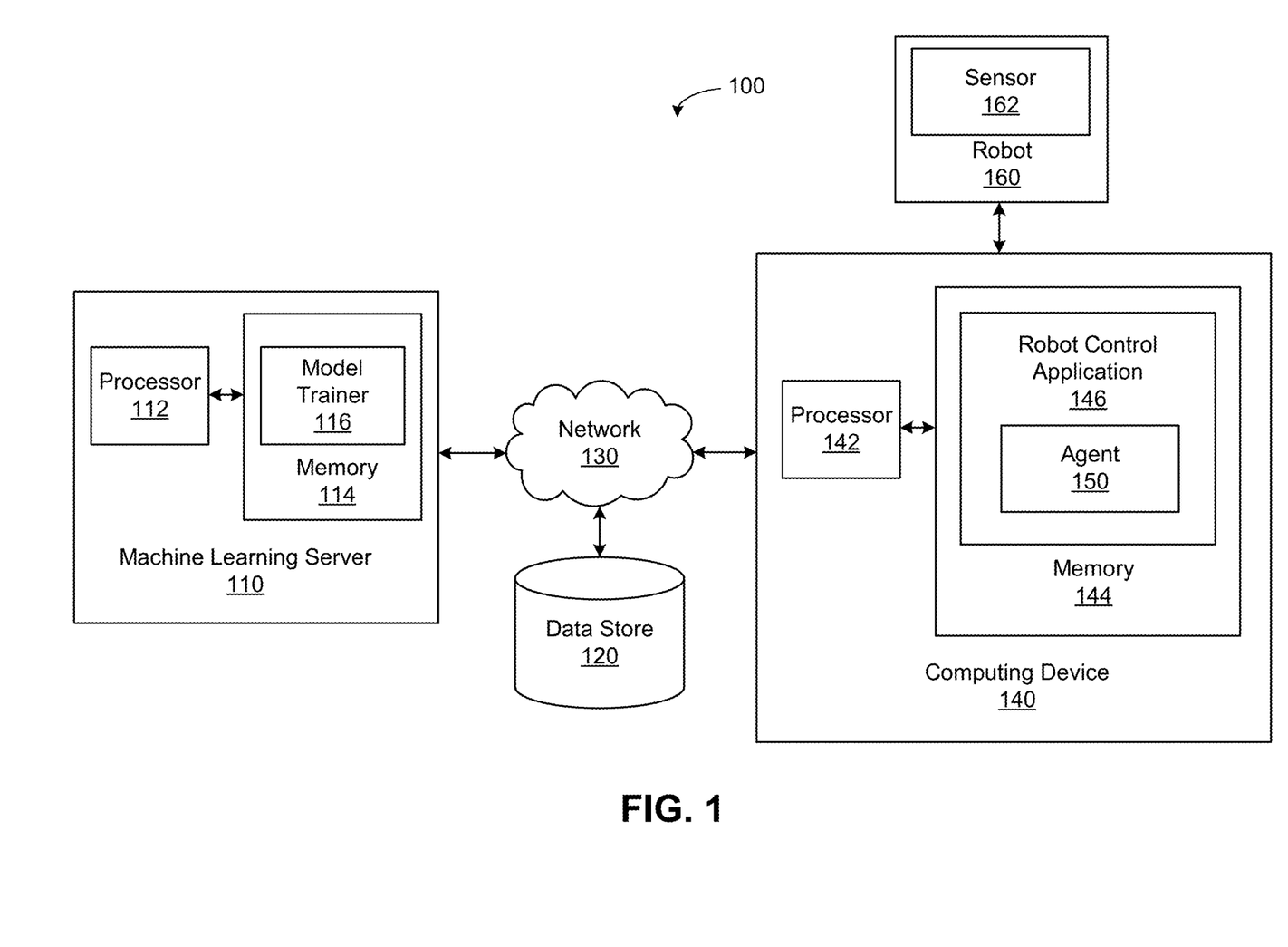
FIG. 1 is a conceptual illustration of a system configured to implement one or more aspects of the various embodiments.

FIG. 1 illustrates a system 100 configured to implement one or more aspects of the various embodiments. As shown, the system 100 includes a machine learning server 110, a data store 120, and a computing device 140 in communication over a network 130, which may be a wide area network (WAN) such as the Internet, a local area network (LAN), or any other suitable network.

As shown, a model trainer 116 executes on a processor 112 of the machine learning server 110 and is stored in a system memory 114 of the machine learning server 110. The processor 112 receives user input from input devices, such as a keyboard or a mouse. In operation, the processor 112 is the master processor of the machine learning server 110, controlling and coordinating operations of other system components. In particular, the processor 112 may issue commands that control the operation of a graphics processing unit (GPU) that incorporates circuitry optimized for graphics and video processing, including, for example, video output circuitry. The GPU may deliver pixels to a display device that may be any conventional cathode ray tube, liquid crystal display, light-emitting diode display, or the like.

The system memory 114 of the machine learning server 110 stores content, such as software applications and data, for use by the processor 112 and the GPU. The system memory 114 may be any type of memory capable of storing data and software applications, such as a random access memory (RAM), a read-only memory (ROM), an erasable programmable read-only memory (EPROM or Flash ROM), or any suitable combination of the foregoing. In some embodiments, a storage (not shown) may supplement or replace the system memory 114. The storage may include any number and type of external memories that are accessible to the processor 112 and/or the GPU. For example, and without limitation, the storage may include a Secure Digital Card, an external Flash memory, a portable compact disc read-only memory (CD-ROM), an optical storage device, a magnetic storage device, or any suitable combination of the foregoing.

It will be appreciated that the machine learning server 110 shown herein is illustrative and that variations and modifications are possible. For example, the number of processors 112, the number of GPUs, the number of system memories 114, and the number of applications included in the system memory 114 may be modified as desired. Further, the connection topology between the various units in FIG. 1 may be modified as desired. In some embodiments, any combination of the processor 112, the system memory 114, and a GPU may be replaced with any type of virtual computing system, distributed computing system, or cloud computing environment, such as a public, a private, or a hybrid cloud.

The model trainer 116 is configured to train machine learning models via reinforcement learning. In particular, the model trainer 116 trains a model of a policy for controlling a robot to perform an assembly task so as to maximize a reward function when the assembly task is performed in a simulated environment, as discussed in greater detail below in conjunction with FIGS. 2-3 and 6. The machine learning model can be trained for any technically feasible assembly task. Examples of assembly tasks include connecting a lap joint and placing a peg into a hole.

Once trained, the machine learning model can be deployed as an agent 150 to control a robot to perform the assembly task based on force and torque measurements acquired by a sensor mounted on the robot. Example machine learning model architectures, as well as techniques for training and deployed machine learning models, are discussed in greater detail below in conjunction with FIGS. 2-7.

Training data and/or trained machine learning models can be stored in the data store 120. In some embodiments, the data store 120 may include any storage device or devices, such as fixed disc drive(s), flash drive(s), optical storage, network attached storage (NAS), and/or a storage area-network (SAN). Although shown as accessible over the network 130, in some embodiments the machine learning server 110 may include the data store 120.

The agent 150 can be deployed to any suitable applications that control physical robots or robots in simulations to perform assembly tasks, such as the robot control application 146 shown in FIG. 1. Illustratively, the robot control application 146 is stored in a memory 144, and executes on a processor 142 of the computing device 140 to control a robot 160. The robot 160 can be any technically feasible robot, operating in any suitable environment (e.g., a construction or manufacturing environment), that includes one or more sensors, shown as sensor 162, for measuring the force and torque at an end effector of the robot 160. As discussed in greater detail below in conjunction with FIGS. 5 and 7, the agent 150 generates actions for controlling the robot 160 given the force and torque measurements acquired by the sensor 162 of the robot 160. Components of the computing device 140, including the memory 144 and the processor 142 may be similar to corresponding components of the machine learning server 110, described above.

The number of machine learning servers and computing devices may be modified as desired. Further, the functionality included in any of the applications may be divided across any number of applications or other software that are stored and execute via any number of devices that are located in any number of physical locations.

Reinforcement Learning for Robot-Agnostic Force-Guided Assembly Tasks

Figure 2:
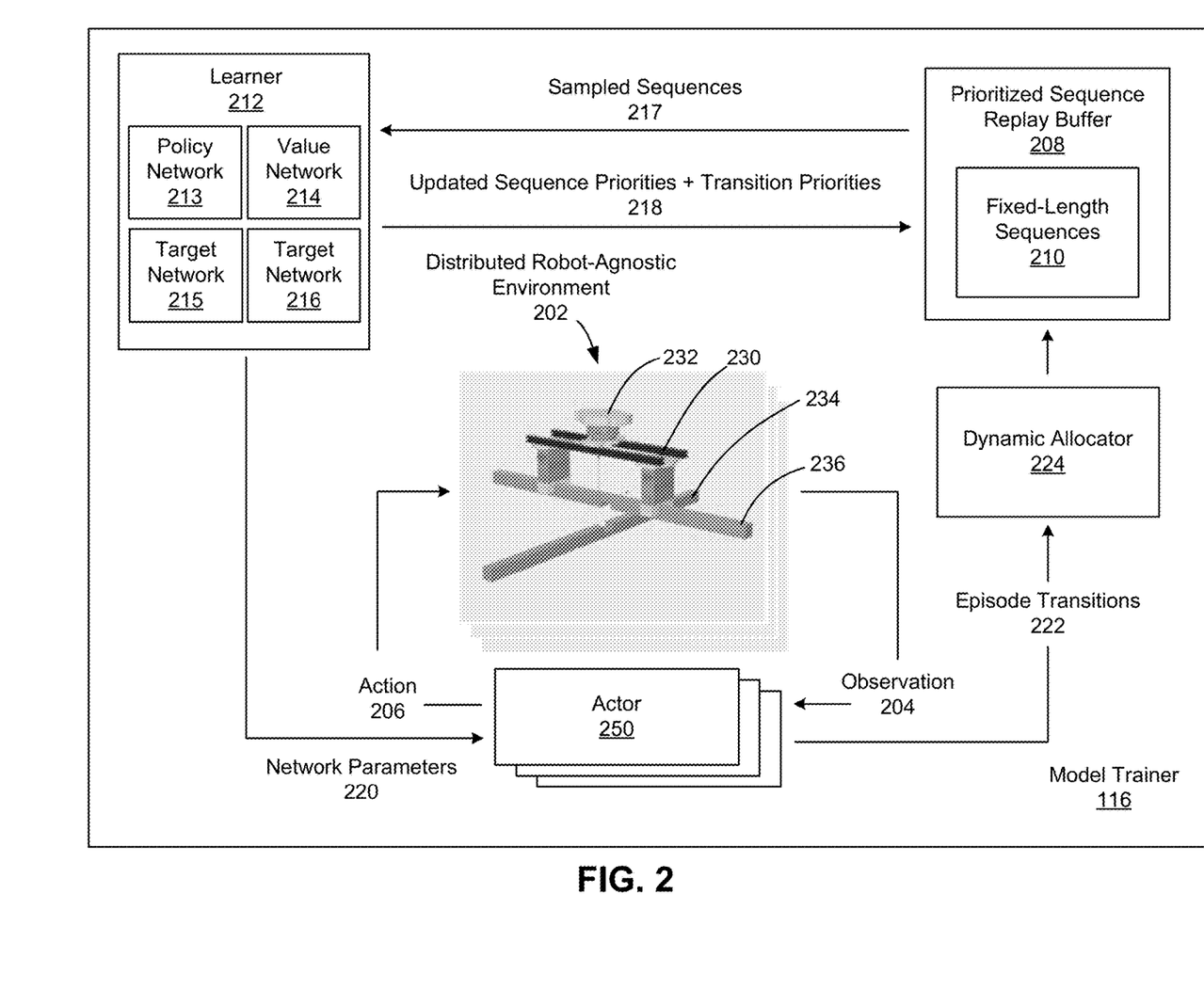
FIG. 2 illustrates a reinforcement learning approach for controlling robotic assembly, according to various embodiments.

FIG. 2 illustrates a reinforcement learning approach for controlling robotic assembly, according to various embodiments. As shown, actors 250 (referred to herein individually as an actor 250 and collectively as actors 250) are configured to take observations 204 that include force and torque measurements as inputs. Given the observations 204, the actors 250 generate actions 206 in the form of linear and angular velocities in the task space (e.g., Cartesian space), such as linear and angular velocities at the center of an assembly piece under control for an assembly task. The actions 206 are then simulated in a distributed robot-agnostic environment 202, and rewards associated with those actions 206 are computed. The observations 204, actions 206, and associated rewards are collected as transitions 222 (also sometimes referred to as "timesteps") of an episode, and multiple episodes can be simulated during training. Each episode starts at the beginning of an assembly task and ends (1) when the assembly task is completed, such as when a distance between a goal pose and the pose of a joint member, which is an external piece held by the robot, is within a pre-defined threshold; or (2) when a pre-defined number of transitions (e.g., 4000 transitions) are reached, in which case a new episode can begin. In some embodiments, the transitions 222 within an episode can be group together into sequences, and the last two sequences of the episode can have a variable overlap. The collected episode transitions 222 are persisted in a prioritized sequence replay buffer 208. The replay buffer 208 stores a collection of sequences, and each sequence includes a collection of transitions.

A learner 212 samples sequences 217 to learn from based on priorities assigned to sequences and priorities assigned to transitions within the sequences. The learner 212 learns by updating parameters of learner neural networks, which as shown include a policy network 213, a value network 214, and corresponding target networks 215 and 216, based on the sampled sequences 217, so as to maximize a reward over time. The policy network 213 (also sometimes referred to as the "actor" network) is an artificial neural network that takes force and torque measurements as inputs and outputs an action. The value network 214 (also sometimes referred to as the "critic" network) is an artificial neural network that critiques actions output by the policy network 213. For example, the value network 214 could predict a value associated with a state or an action-state pair (q-value) for each action output by the policy network 213 so that it can be determined whether improvements are being made. The target networks 215 and 216 improve the stability of training and are periodically synchronized with the policy network 213 and the value network 214, respectively. The learner 212 further updates the transition priorities and the sequence priorities, shown as updated transition and sequence priorities 218, of the replay buffer 208. In addition, the actors 250 periodically update parameters of their own neural networks based on the parameters of the learner networks 213, 214, 215, and 216. Similar to the learner 212, each of the actors 250 can include a policy network, a value network, and corresponding target networks (not shown). A system including a learner and N actors that each include a policy network, a target policy network, a value network, and a target value network, where each neural network includes a long short-term memory (LSTM) layer between the first and second fully-connected layers in the neural network, is also referred to herein as a distributed deep deterministic policy gradient (DDPG) system (RD2). Accordingly, a machine learning model, namely the policy network 213, that models a policy for achieving an assembly task through sequential decision making can be trained via deep reinforcement learning. The trained machine learning model can then be deployed as an agent (e.g., agent 150) that generates actions for moving a physical robot, or a robot within a simulation, given force and torque measurements acquired by one or more sensors mounted on the robot.

More specifically, each actor 250 acts within its own instance of the robot-agnostic environment 202 during training to collect episodes of actions 206, observations 204 in the form of forces and torques that are received as feedback from the environment 202 when the actions 205 are performed, and associated rewards (o, α, r). The instance of the robot-agnostic training environment 202 can be simulated without a model of a robot. In some embodiments, the simulation can include objects contributing to force and torque measurements. Illustratively, for the assembly task of connecting a lap joint, the simulation can include a model of a gripper 230 that includes two fingers, a force-torque sensor 232 that is mounted above the gripper, and a pair of joint members 234 and 236. When the joint member 234 that is being held by the gripper 230 is in contact with the joint member 236, forces and torques in different directions can be measured via the force-torque sensor 232. As another example, for the assembly task of placing a peg into a hole, the simulation can include models of a gripper, a force-torque sensor, and a tampered peg and a hole. In such a case, when the peg being held by the gripper is in contact with the inside of the hole, the force-torque sensor can sense forces and torques in different directions. Although described herein primarily with respect to grippers as a reference example, in other embodiments, force and torque measurements can be acquired, during simulation and when a trained machine learning model is deployed, by a sensor mounted on or proximate to any technically feasible end effector of a robot. During a simulation in some embodiments, each dynamic object can also be assigned an estimated inertial property (e.g., mass and center of mass) and applied friction, and the force-torque sensor can be gravity compensated.

As described, transitions 222 that each include an observation, an action, and an associated reward are collected, and an episode that includes multiple transitions ends when the distance between a goal pose and the pose of a joint member is within a pre-defined threshold, or when a pre-defined number of transitions is reached. As the length of each episode is not known prior to simulation, the model trainer 116 employs a dynamic allocation technique (shown as dynamic allocator 224) to break an episode of transitions $(o_1, \alpha_1, r_1, \ldots, o_t, \alpha_t, r_t)$ into a group of fixed-length sequences of transitions 210, which are then stored in the replay buffer 208. In some embodiments, when processing the transitions 222, the dynamic allocator 224 allows an overlap between the last two sequences in each episode to be variable, as described in greater detail below in conjunction with FIG. 4. The variable overlap between the last two sequences helps to maintain information of the transitions in the last two sequences, while avoiding the crossing of episode boundaries.

During training, exploration is disconnected from learning by having multiple actors 250 interacting with their own environments and sending collected transitions 222 to the replay buffer 208. The learner 212 asynchronously samples sequences of transitions (shown as sampled sequences 217) from the replay buffer 208 based on priorities assigned to the sequences and to transitions within the sequences. Transitions and sequences having higher priorities are considered to be more important and are more likely to be sampled and used to update parameters of the learner networks 213, 214, 215, and 216. Use of priorities can speed up the learning process by prioritizing unexpected transitions that provide more information during the learning process and are associated with higher priorities. Experience has shown that the use of priorities for sequences in addition to priorities for transitions can stabilize the training process. Given the sequences that are sampled based on the transition and sequence priorities, the learner 212 performs learning operations (e.g., deep Q learning) to update the parameters of the learner networks 213, 214, 215, and 216. The learner 212 further updates 218 the priorities of the sequences and of the individual transitions. The updated priorities can be used in future sampling by the learner 212. Periodically, the parameters of neural networks of the actors 250 are updated based on the parameters of the learner networks 213, 214, 215, and 216.

Subsequent to training, the policy network 213 of the learner 212 models a policy for performing the assembly task. The trained policy network 213 can then be deployed, without re-training, to control various types of robots to perform the same assembly task. For example, the policy network 213 could be deployed as the agent 150 included in the robot control application 146, described above in conjunction with FIG. 1. In such a case, the robot control application 150 can input force and torque measurements acquired by the sensor 162 of the robot 160 into the policy network of the agent 150, which then outputs actions that can be used to control the robot 160.

More formally, a robotic assembly task problem can be modeled as a Partially Observable Markov Decision Process (POMDP) that is described by a set of states S, a set of actions A, and a set of conditional probabilities $p(s_{t+1}|s_t,\alpha_t)$ for the state transition $s_t, s_{t+1}$, a reward function $R:S \times A \to \mathbb{R}$, a set of observations $\Omega$, a set of conditional observation probabilities $p(o_t|s_t)$, and a discount factor $\gamma \in [0,1]$. In operation, an agent (e.g., agent 150 or one of actors 250) makes decisions based on the history of observations and actions $h_t=(o_1, \alpha_1, o_2, \alpha_2 \ldots o_t, \alpha_t)$. The goal of training is to learn an optimal policy $\pi_\theta$ in order to maximize the expected discounted rewards indicating how well the assembly task has been performed:

$$\max_{\pi_\theta} \mathbb{E}_{\tau \sim \pi_\theta} \left[ \sum_{t=1}^{T} \gamma^{t-1} r(s_t, a_t) \right], \quad (1)$$

where trajectory $\tau=(s_1, o_1, \alpha_1, s_2, o_2, \alpha_2, \ldots, s_T, o_T, \alpha_T)$, $\theta$ is the parameterization of policy $\pi$, and $\pi_\theta(\tau)=p(s_1)p(o_1|s_1)\pi_\theta(\alpha_1|h_1)\Pi_2^T p(s_t|s_{t-1},\alpha_{t-1})p(o_t|s_t)\pi_\theta(\alpha_t|h_t)$.

In some embodiments, a simulator with a physics engine (e.g., the Bullet physics engine) is used in training to simulate a robot assembly task. In such cases, the training can be performed entirely using the simulator, while the trained machine learning model can be deployed to control either a physical robot or a robot within a simulation. Example simulations for different types of assembly tasks are described above. During a simulation, the observation space can be the 6-dimensional force and torque measurement $(f_x, f_y, f_z, \tau_x, \tau_y, \tau_z)$ from a sensor. The action space is the continuous and 6-dimensional desired Cartesian-space linear velocity $(v_x, v_y, v_z)$ and angular velocity $(w_x, w_y, w_z)$ at the center of the assembly piece under control for the assembly task.

During training, the model trainer 116 maximizes a linear reward function indicating how well the assembly task has been performed based on the distance between a goal pose and a current pose:

$$r = \begin{cases} -|g - x|, & |g - x| > \epsilon \\ -|g - x| + R, & |g - x| \leq \epsilon \end{cases}, \quad (2)$$

where x is the current pose of a joint member, g is the goal pose, E is a distance threshold, and R is a large positive reward. A negative distance is used as the reward function to discourage the behavior of loitering around the goal, because the negative distance also include a time penalty.

For a robotic assembly task problem, conditioning on the entire history of observations is, as a general matter, impractical. Some embodiments address this challenge using machine learning models that are recurrent neural networks trained using distributed model-free reinforcement learning, focusing on the continuous action domain. A trained policy network can then be deployed to control robots in diverse real-world environments, including architectural construction sites, in which a robot is controlled based on force and torque measurements acquired by an on-board low-dimensional sensor. As described, in some embodiments, a LSTM layer is added between the first fully-connected layer and the second fully-connected layer in the policy network 213, the value network 214, and the corresponding target networks 215 and 216 of the learner 212, as well as similar neural networks of the actors 250. The LSTM layer adds recurrency to those neural networks, which allows a memory-based representation to be learned that compensates for partial observability due to only force and torque measurements being available, by also inputting historical actions and observations to help with decision making. Accordingly, the LSTM layer can compensate for lack of pose observations when only force and torque measurements are used. In addition, the LSTM can include gates for forgetting past memories. Further, experience has shown that the LSTM layer can help a policy network adapt to new environments. Although discussed herein primarily with respect to an LSTM layer, in some embodiments, one or more memory layers other than an LSTM layer may be used.

Figure 3:
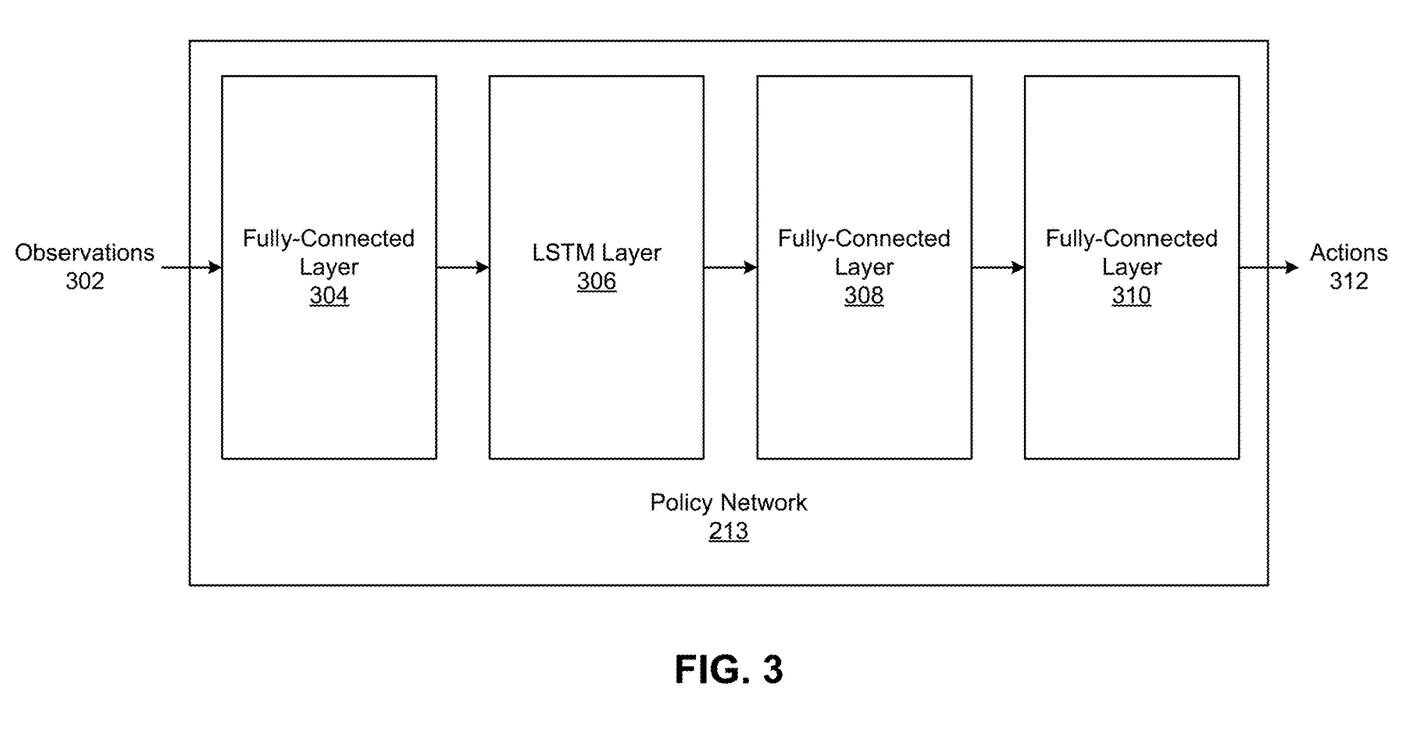
FIG. 3 illustrates in greater detail layers of the policy network of FIG. 2, according to various embodiments.

FIG. 3 illustrates in greater detail layers of the policy network 213, according to various embodiments. In some embodiments, the value network 214, the target networks 215 and 216, and the neural networks of the actors 250 also include a LSTM layer between a first fully-connected layer and a second fully-connected layer of those networks. As shown, the policy network 213 includes a first fully-connected layer 304, a LSTM layer 306, a second fully-connected layer 308, and a third fully-connected layer 310. The LSTM layer 306, itself, can include multiple layers. Well-known LSTM layers can be used in some embodiments. In some embodiments, the first fully-connected layer 304 takes as input a number of observations 302, has an output size of 256, and employs a ReLU (Rectified Linear Unit) activation function. In such cases, the LSTM layer 306 can have an input size of 256, an output size of 256, and employ a ReLU activation function. The second fully-connected layer 308 can be a Q Network layer having an input size of 256 and an output size of 1. In addition, the third fully-connected layer 310 can be a $\pi$ network layer having an input size of 256 and output a number of actions 312. In other embodiments, a memory layer, such as an LSTM layer, can be added to other types of neural networks that are trained and deployed according to techniques disclosed herein.

Returning to FIG. 2, the replay buffer 208 stores fixed-length sequences of transitions. In some embodiments, each sequence includes (m, m=2k, where $k \in \mathbb{Z}^+$) transitions, and each transition has the form (observation, action, reward). Adjacent sequences can overlap by m/2 transitions, and sequences do not cross an episode boundary.

As described, the length of each episode corresponding to an assembly task can vary. In some embodiments, the overlap between two last sequences in each episode is variable between $$\left[\frac{m}{2}, m-1\right]$$

transitions. In some embodiments, the last overlap can be calculated as:

$$O = \begin{cases} m - T\bmod\left(\frac{m}{2}\right), & T\bmod\left(\frac{m}{2}\right) \neq 0 \\ m/2, & T\bmod\left(\frac{m}{2}\right) = 0 \end{cases}, \quad (3)$$

where O is the number of transitions in the last overlap and T is the total number of transitions in each episode. Allowing the last overlap in each episode to be variable prevents losing or compromising any transitions at the end of each episode, which can include crucial information, particularly for training.

Figure 4:
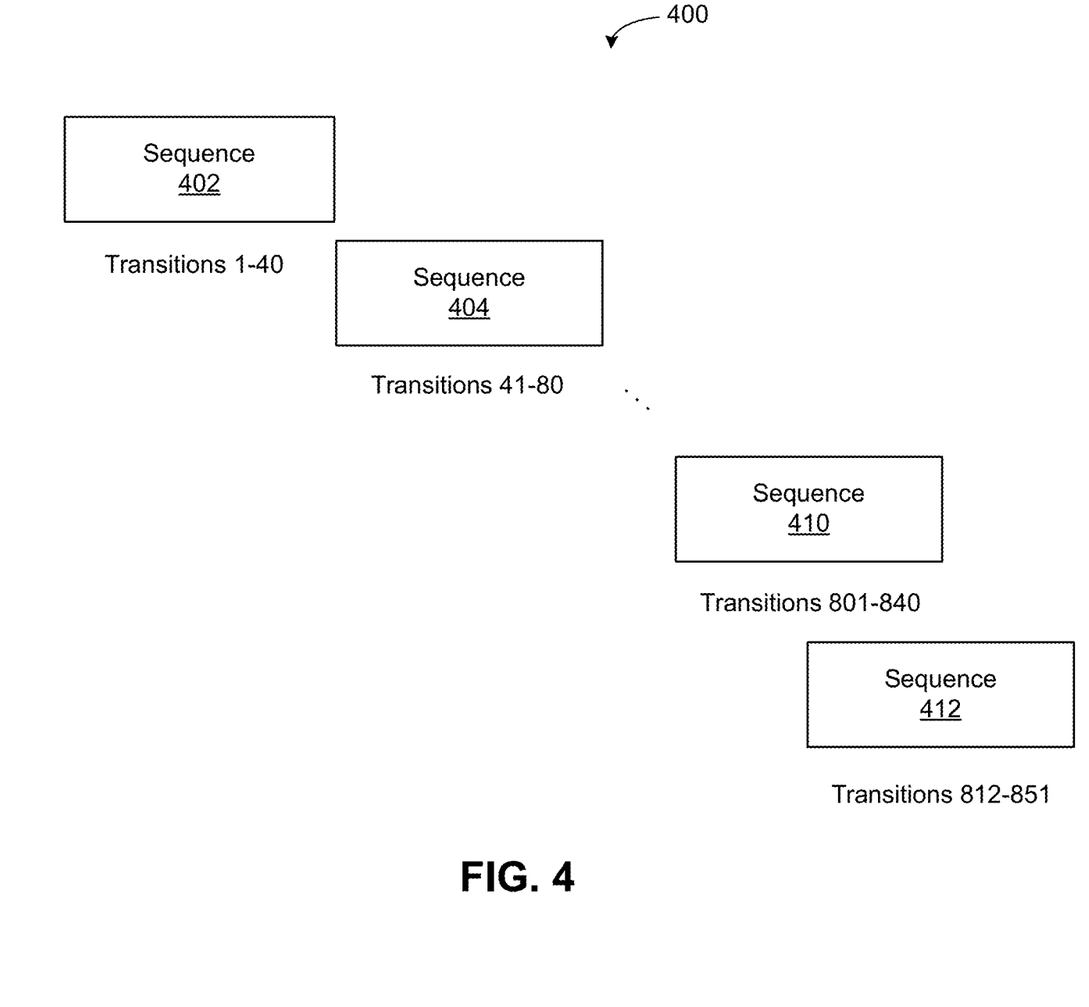
FIG. 4 illustrates an exemplar allocation of transitions in an episode to sequences, according to various embodiments.

FIG. 4 illustrates an exemplar allocation of transitions in an episode to sequences, according to various embodiments. As shown, an exemplar episode 400 includes 851 transitions. Other episodes can include different numbers of transitions. As described, an episode starts at the beginning of an assembly task and ends (1) when the assembly task is completed, such as when a distance between a goal pose and the pose of a joint member is within a pre-defined threshold; or (2) when a pre-defined number of transitions (e.g., 4000 transitions) are reached. During training, an episode is simulated in an environment of the distributed robot-agnostic environment 202, and a number of transitions are collected. Then, the dynamic allocator 224 divides the collected transitions into sequences that each include a fixed number of transitions. Illustratively, each sequence 402, 404, 410, and 412 includes 40 transitions from the 851 transitions of the episode 400. The number of transitions included in the sequence can be based on the number of transitions that the policy network 213 and value neural network 214 of the learner 212 take as inputs. In the example of 40 transitions per sequence, the transitions of the episode 400 can be divided so that a first sequence 402 includes transitions 1-40, a second sequence includes transitions 41-80, etc. However, continuing such a division, the last sequence would include 11 transitions from 840-851, rather than the required 40 transitions. Rather than taking transitions from a subsequent episode and adding those transitions to the last sequence, which can confuse the neural network, the last sequence is moved back to overlap with the second-to-last sequence in some embodiments. As shown, a second-to-last sequence 410 includes transitions 801-840, and a last sequence 412 includes transitions 812-851. As the number of transitions in any given episode can be variable, the overlap between the last two sequences of the episode is also variable. In some embodiments, the overlap between the last two sequences can be computed according to equation (3), described above in conjunction with FIG. 2.

Returning to FIG. 2, during training in some embodiments, the learner 212 samples sequences in the replay buffer 208 based on their priorities p, as follows:

$$p=\eta \max(\delta)+(1-\eta)\bar{\delta}, \quad (4)$$

where δ is a list of absolute n-step temporal difference (TD)-errors in one sequence, and η can be set to, e.g., 0.9 to avoid compressing the range of priorities and limiting the ability of an agent to pick out useful experiences. Prioritizing replay can introduce bias, because the distribution of stochastic updates is changed in an uncontrolled manner, thereby changing the solution that estimates converge to. In some embodiments, the bias for each transition in a sequence is corrected using bias annealing on the transition level to achieve more stable performance, using the following importance sampling weights:

$$w_i=(N \times P(i))^{-\beta}, \quad (5)$$

where N is the size of the replay buffer and β is set to 0.4. In addition, the weight of each transition can be normalized before the sequences are sent to the leaner 212 for back-propagation through time (BPTT) by $1/\max_i w_i$. In some embodiments, two sum-tree data structures can be initialized, one of which keeps the priorities of the sequences and the other of which keeps the priorities of the transitions.

Experience has shown that such sum-tree data structures help to stabilize the training process for robot assembly tasks.

To implement training in some embodiments, the model trainer 116 uses a zero start state in the LSTM layer to initialize the learner networks 213, 214, 215, and 216 at the beginning of a sampled sequence and performs training with Population Based Training (PBT). In some embodiments, every training session can include a number (e.g., 8) of concurrent trials, each of which includes a single learner and multiple (e.g., 8) workers. The length of sequences and n-step can be mutable hyperparameters of the PBT. Each of the concurrent trials evaluates every few (e.g., 5) iterations whether to keep the current training or to copy network parameters from a better trial. If a copy happens, the mutable hyper-parameters can be perturbed by, e.g., a factor of 1.2 or 0.8 to have a 25% probability to be re-sampled from the original distribution.

Figure 5:
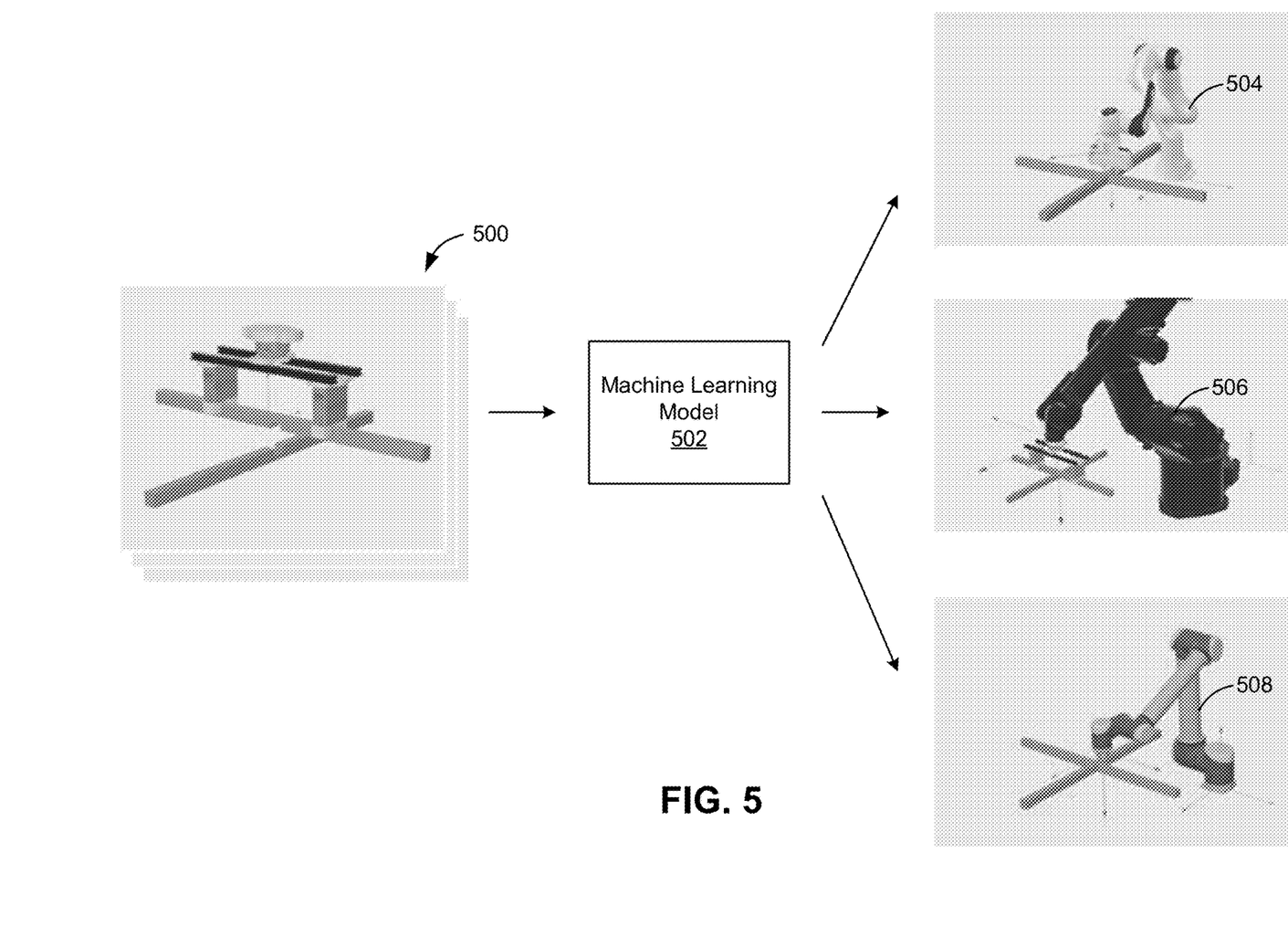
FIG. 5 illustrates how a trained machine learning model can be deployed to control multiple exemplar robots, according to various embodiments.

FIG. 5 illustrates how a trained machine learning model can be deployed to control multiple exemplar robots, according to various embodiments. As shown, a machine learning model 502 (e.g., the policy network 213) is trained, along with other machine learning models (e.g., the learner networks 214, 215, and 216 and the neural networks of the actors 250) in a robot-agnostic training environment 500 (e.g., the distributed robot-agnostic environment 202) to take force and torque measurements as inputs and to output actions for performing an assembly task. Once trained, the machine learning model 502 models a policy for achieving the assembly task and can be deployed (in, e.g., the robot control application 146) to control various types of robots, shown as robotic arms 504, 506, and 508, that include a force and torque sensor to perform the same assembly task. The robots can be physical robots or robots in a simulation. A physical robot can be operated in any suitable environment, such as an architectural construction site or a manufacturing site. Further, the machine learning model 502 can be applied to control the robotic arms 504, 506, and 508, even though the machine learning model 502 was not specifically trained for any of those robotic arms 504, 506, and 508.

In some embodiments, in order to transfer policies trained in the robotless environment 202 to a deployment environment associated with a physical robot, the robot control application 146 applies a coordinate transformation to force and torque measurements using the force-torque twist matrix. Let the force and torque from the coordinates in the robotless environment 202 (frame $\mathcal{F}_b$) be $^b h=(^b f,^b \tau)$, and let the force and torque from the coordinates in the end-effector of a robotic arm (frame $\mathcal{F}_a$) be $^a h=(^a f,^a \tau)$, then the transformation is:

$$^a h = \begin{bmatrix} ^a R_b & 0_3 \\ [^a t_b]^a R_b & ^a R_b \end{bmatrix} {}^b h, \quad (6)$$

where $^a R_b$ and $^a t_b$ are the rotation matrix and the translation vector, respectively, from frame $\mathcal{F}_a$ to frame $\mathcal{F}_b$.

In some embodiments, the action space is defined as the Cartesian-space velocity at a center of the assembly piece under control, which can be identical across robotic arm setups. Accordingly, no transformation is needed for actions. In addition, when the actions in an assembly task are confined in a small enough operational area, inverse kinematics are guaranteed to be satisfied. In such cases, the robot control application 146 can use inverse kinematics to solve for joint motions of the robot that are required to achieve an action output by the machine learning model 502.

Figure 6:
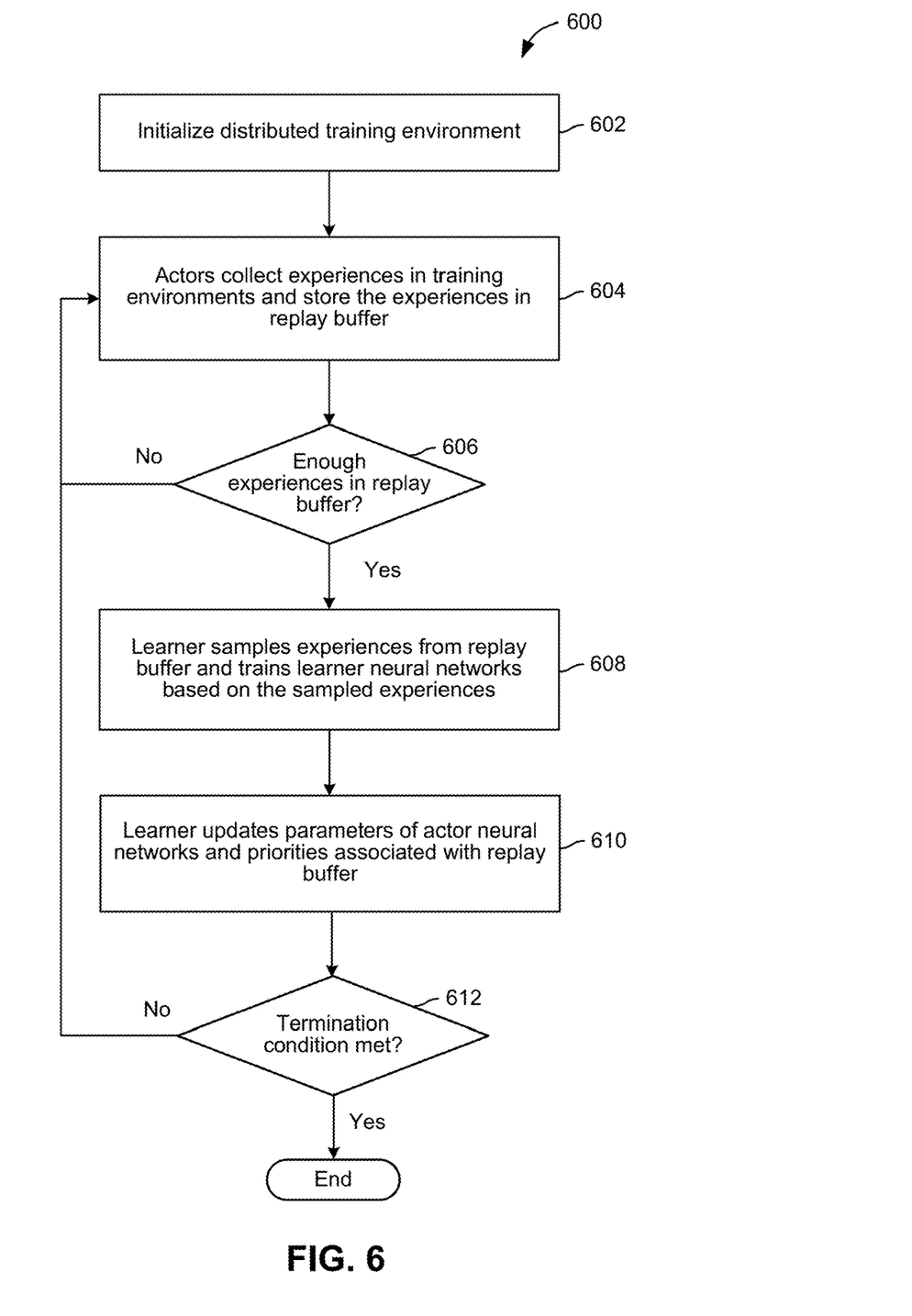
FIG. 6 is a flow diagram of method steps for training a machine learning model to control robotic assembly, according to various embodiments.

FIG. 6 is a flow diagram of method steps for training a machine learning model to control robotic assembly, according to various embodiments. Although the method steps are described in conjunction with the systems of FIG. 1-3, persons of ordinary skill in the art will understand that any system configured to perform the method steps, in any order, is within the scope of the present disclosure.

As shown, a method 600 begins at step 602, where the model trainer 118 initializes a distributed training environment (e.g., the distributed robot-agnostic environment 202). In some embodiments, the model trainer 118 can initialize a number of training environments (e.g., 16 training environments), one for each of a number of actors (e.g., actors 250). Although described herein primarily with respect to a distributed training environment, in other embodiments, a machine learning model can be trained in a training environment that is not distributed.

At step 604, actors (e.g., actors 250) collect experiences in respective training environments and store the experiences in a replay buffer (e.g., replay buffer 208). As described, in some embodiments, the experiences in an episode can include a number of transitions, each of which includes an observation, action, and an associated reward, and the transitions can be grouped together into sequences. In such cases, an overlap between the last two sequences in the episode can be variable between $$\left[\frac{m}{2}, m-1\right]$$

transitions, as described above in conjunction with FIG. 2.

At step 606, if not enough experiences have been collected and stored in the replay buffer, then the method 600 returns to step 604, where the actors collect additional experiences and store those experiences in the replay buffer. On the other hand, if enough experiences have been collected and stored in the replay buffer, then the method 600 continues to step 608, where a learner (e.g., learner 212) samples experiences from the replay buffer and trains neural networks of the learner (e.g., the policy network 213, the value network 214, and the target networks 215 and 216) based on the sampled experiences. In some embodiments, the training maximizes, over time, a reward indicating how well an assembly task has been performed, as described above in conjunction with FIG. 2.

At step 610, the learner updates parameters of neural networks of the actors, which are similar to the learner neural networks, and the transition and sequence priorities of the replay buffer. As described, the actors are collecting experiences in the training environments. In some embodiments, the transition and sequence priorities are computed according to the techniques described above in conjunction with FIG. 2.

At step 612, if a termination condition of the training has not been satisfied (e.g., the reward has not been maximized and a maximum number of iterations have not occurred), then the method 600 returns to step 604, where the actors collect additional experiences in their respective training environments and store the experiences in the replay buffer. Although steps 604-612 are shown as sequential for illustrative purposes, in some embodiments, the actors continue collecting experiences and storing the same in the replay buffer while, in parallel, the learner samples experiences from the replay buffer, trains the learning neural networks, and updates parameters of the neural networks of the actors and the transition and sequence priorities of the replay buffer.

Figure 7:
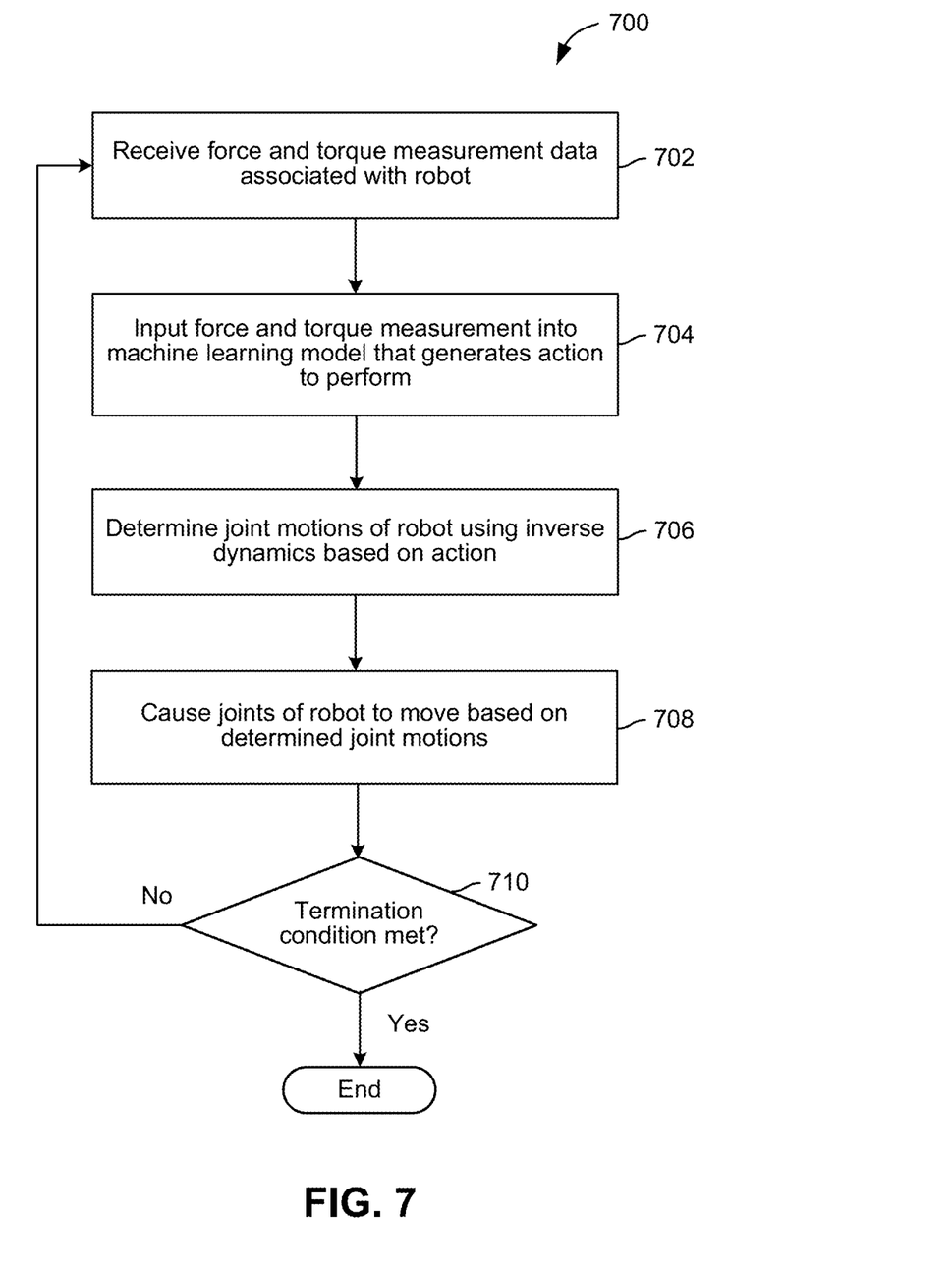
FIG. 7 is a flow diagram of method steps for controlling a robot when perform an assembly task, according to various embodiments.

FIG. 7 is a flow diagram of method steps for controlling a robot when perform an assembly task, according to various embodiments. Although the method steps are described in conjunction with the systems of FIG. 1-3, persons of ordinary skill in the art will understand that any system configured to perform the method steps, in any order, is within the scope of the present disclosure.

As shown, a method 700 begins at step 702, where the robot control application 146 receives force and torque measurement data associated with a robot. As described, in some embodiments, a sensor can be mounted above a gripper of the robot, or elsewhere on an end effector (which may or may not be a gripper) of the robot, to acquire 6-dimensional force and torque measurements ($f_x$, $f_y$, $f_z$, $\tau_x$, $\tau_y$, $\tau_z$). In some embodiments, a coordinate transformation is also applied to the force and torque measurements using the force-torque twist matrix, described above in conjunction with FIG. 5.

At step 704, the robot control application 146 inputs the force and torque measurements (after the coordinate transformation is applied) into a machine learning model that generates an action to perform. In some embodiments, an agent (e.g., the agent 150) includes a policy network (e.g., policy network 213) that is trained, according to the method 600 described above in conjunction with FIG. 6, to generate actions for achieving an assembly task given force and torque measurements as inputs.

At step 706, the robot control application 146 determines joint motions of the robot using inverse dynamics based on the action generated at step 704. As described, the action generated by the agent can include linear and angular velocities in the task space (e.g., Cartesian space), such as linear and angular velocities at the center of an assembly piece under control for an assembly task. In such cases, inverse dynamics can be used to solve for joint motions of the robot that are required to achieve the velocity.

At step 708, the robot control application 146 causes joints of the robot to move according to the determined joint motions. For example, the robot control application 146 could transmit command signals directly to the joints of the robot or to a controller of the joints.

At step 710, if a termination condition has not been satisfied, then the method 700 returns to step 702, where the robot control application 146 receives additional force and torque measurement data from the robot. In some embodiments, the termination condition can include a distance between a pose of a joint member and a goal pose being less than a threshold, or the number of transitions being equal to a maximum number of transitions. If the termination condition has been satisfied, then the method 700 ends.

In sum, techniques are disclosed for training and applying machine learning models to control robotic assembly tasks. In some embodiments, force and torque measurements are input into a machine learning model that includes a memory layer that introduces recurrency to compensate for the partial observability due to force and torque measurements being used, rather than pose observations. The machine learning model is trained, via reinforcement learning in a robot-agnostic environment, to learn a policy for generating actions to achieve an assembly task given force and torque measurements as inputs. During training, experiences are collected as transitions within episodes. The transitions are grouped together into sequences, and the last two sequences of each episode have a variable overlap. The collected transitions are stored in a prioritized sequence replay buffer, from which a learner samples sequences to learn from based on transition priorities and sequence priorities. The learner learns by updating parameters of learner machine learning models based on the sampled sequences, and the learner further updates the transition priorities and sequence priorities. Once trained, the machine learning model can be deployed, without re-training, to control various types of robots to perform the assembly task based on force and torque measurements acquired by sensors mounted on those robots.

One technical advantage of the disclosed techniques relative to the prior art is that, with the disclosed techniques, a machine learning model can be trained to control a robot to perform an assembly task in an unstructured environment, without requiring as inputs the pose of a robot and/or other objects in the environment that need to be captured via a motion capture or other tracking system, or inferred indirectly via a vision-based system. In addition, with the disclosed techniques, the policies learned during training are robot-agnostic, which enables those policies to be used to control various types of robots. These technical advantages represent one or more technological advancements over prior art approaches.

1. In some embodiments, a computer-implemented method for controlling a robot comprises receiving sensor data associated with the robot, wherein the sensor data comprises at least one of force data or torque data, applying a machine learning model to the sensor data to generate an action, wherein the machine learning model is trained via reinforcement learning, and causing the robot to perform one or more movements based on the action.
2. The computer-implemented method of clause 1, wherein the machine learning model comprises at least one memory layer.
3. The computer-implemented method of clauses 1 or 2, wherein the machine learning model further comprises at least one of a fully-connected layer, a Q network, or a pi network.
4. The computer-implemented method of any of clauses 1-3, wherein during the reinforcement learning, the machine learning model is trained in an environment that does not include a model of the robot.
5. The computer-implemented method of any of clauses 1-4, wherein during the reinforcement learning, a learner updates parameters of the machine learning model, and the learner further updates one or more priorities used to sample stored transitions that each comprise an observation, an action, and a reward and one or more priorities used to sample sequences that each comprise multiple transitions.
6. The computer-implemented method of any of clauses 1-5, wherein during the reinforcement learning, the learner further updates parameters of at least one other machine learning model, and the at least one other machine learning model is applied in at least one simulation environment.
7. The computer-implemented method of any of clauses 1-6, wherein during the reinforcement learning, two last time sequences that comprise transitions in an episode of transitions overlap, and an amount of the overlap is based on a length of the episode, and each transition included in the episode of transitions comprises an observation, an action, and a reward.
8. The computer-implemented method of any of clauses 1-7, wherein the action comprises a target velocity, and causing the robot to perform the one or more movements based on the action comprises computing one or more movements of one or more joints of the robot using inverse dynamics based on the target velocity, and transmitting at least one command signal to the robot based on the one or more movements of the one or more joints.
9. The computer-implemented method of any of clauses 1-8, wherein the sensor data is acquired by a sensor that is mounted on an end effector of the robot.
10. The computer-implemented method of any of clauses 1-9, further comprising determining whether a distance between a pose of a joint member and a target pose is less than a threshold distance.
11. In some embodiments, one or more non-transitory computer-readable media include instructions that, when executed by at least one processor, cause the at least one processor to perform steps for controlling a robot, the steps comprising receiving sensor data associated with the robot, wherein the sensor data comprises at least one of force or torque data, applying a machine learning model to the sensor data to generate an action, wherein the machine learning model is trained via reinforcement learning, and causing the robot to perform one or more movements based on the action.
12. The one or more non-transitory computer-readable storage media of clause 11, wherein, when executed by the at least one processor, the instructions further cause the at least one processor to perform a step of determining whether a distance between a pose of a joint member and a target pose is less than a threshold distance.
13. The one or more non-transitory computer-readable storage media of clauses 11 or 12, wherein the action comprises a target velocity, and causing the robot to perform the one or more movements based on the action comprises computing one or more movements of one or more joints of the robot using inverse dynamics based on the target velocity, and transmitting at least one command signal to robot based on the one or more movements of the one or more joints.
14. The one or more non-transitory computer-readable storage media of any of clauses 11-13, wherein the sensor data is acquired by a sensor mounted on an end effector of the robot.
15. The one or more non-transitory computer-readable storage media of any of clauses 11-14, wherein the machine learning model comprises a long short-term memory.
16. The one or more non-transitory computer-readable storage media of any of clauses 11-15, wherein the machine learning model further comprises at least one of a fully-connected layer, a Q network, or a pi network.
17. The one or more non-transitory computer-readable storage media of any of clauses 11-16, wherein during the reinforcement learning, the machine learning model is trained along with at least one other machine learning model in a distributed environment that does not include a model of the robot.
18. The one or more non-transitory computer-readable storage media of any of clauses 11-17, wherein during the reinforcement learning, a learner updates parameters of the machine learning model, and the learner further updates one or more priorities used to sample stored transitions that each comprises an observation, an action, and a reward and one or more priorities used to sample sequences that each comprise multiple transitions.

19. The one or more non-transitory computer-readable storage media of any of clauses 11-18, wherein during the reinforcement learning, two last time sequences that comprise transitions in an episode of transitions overlap, and an amount of the overlap is based on a length of the episode, and each transition included in the episode of transitions comprises an observation, an action, and a reward.

20. In some embodiments, a system comprises one or more memories storing instructions, and one or more processors that are coupled to the one or more memories and, when executing the instructions, are configured to receive sensor data associated with the robot, wherein the sensor data comprises at least one of force or torque data, apply a machine learning model to the sensor data to generate an action, wherein the machine learning model is trained via reinforcement learning, and cause the robot to perform one or more movements based on the action.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, method or computer program product. Accordingly, aspects of the present disclosure may take the form of an entirely hardware embodiment, an entirely software embodiment (including firmware, resident software, microcode, etc.) or an embodiment combining software and hardware aspects that may all generally be referred to herein as a "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine. The instructions, when executed via processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable gate arrays.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preceding is directed to embodiments of the present disclosure, other and further embodiments of the disclosure may be devised without departing from the basic scope thereof, and the scope thereof is determined by the claims that follow.

What is claimed is:

1. A computer-implemented method for controlling a robot, the method comprising:
   receiving sensor data associated with the robot, wherein the sensor data comprises at least one of force data or torque data;
   applying a machine learning model to the sensor data to generate an action, wherein the machine learning model is fully trained via reinforcement learning in an environment that does not include a model of the robot throughout a training process for the machine learning model; and
   causing the robot to perform one or more movements based on the action.

2. The computer-implemented method of claim 1, wherein the machine learning model comprises at least one memory layer.

3. The computer-implemented method of claim 2, wherein the machine learning model further comprises at least one of a fully-connected layer, a Q network, or a pi network.

4. The computer-implemented method of claim 1, wherein during the reinforcement learning, a learner updates parameters of the machine learning model, and the learner further updates one or more priorities used to sample stored transitions that each comprise an observation, an action, and a reward and one or more priorities used to sample sequences that each comprise multiple transitions.

5. The computer-implemented method of claim 4, wherein during the reinforcement learning, the learner further updates parameters of at least one other machine learning model, and the at least one other machine learning model is applied in at least one simulation environment.

6. The computer-implemented method of claim 1, wherein:
during the reinforcement learning, two last time sequences that comprise transitions in an episode of transitions overlap, and an amount of the overlap is based on a length of the episode; and
each transition included in the episode of transitions comprises an observation, an action, and a reward.

7. The computer-implemented method of claim 1, wherein the action comprises a target velocity, and causing the robot to perform the one or more movements based on the action comprises:
computing one or more movements of one or more joints of the robot using inverse dynamics based on the target velocity; and
transmitting at least one command signal to the robot based on the one or more movements of the one or more joints.

8. The computer-implemented method of claim 1, wherein the sensor data is acquired by a sensor that is mounted on an end effector of the robot.

9. The computer-implemented method of claim 1, further comprising determining whether a distance between a pose of a joint member and a target pose is less than a threshold distance.

10. One or more non-transitory computer-readable media including instructions that, when executed by at least one processor, cause the at least one processor to perform steps for controlling a robot, the steps comprising:
receiving sensor data associated with the robot, wherein the sensor data comprises at least one of force or torque data;
applying a machine learning model to the sensor data to generate an action, wherein the machine learning model is fully trained via reinforcement learning in an environment that does not include a model of the robot throughout a training process for the machine learning model; and
causing the robot to perform one or more movements based on the action.

11. The one or more non-transitory computer-readable storage media of claim 10, wherein, when executed by the at least one processor, the instructions further cause the at least one processor to perform a step of:
determining whether a distance between a pose of a joint member and a target pose is less than a threshold distance.

12. The one or more non-transitory computer-readable storage media of claim 10, wherein the action comprises a target velocity, and causing the robot to perform the one or more movements based on the action comprises:
computing one or more movements of one or more joints of the robot using inverse dynamics based on the target velocity; and
transmitting at least one command signal to the robot based on the one or more movements of the one or more joints.

13. The one or more non-transitory computer-readable storage media of claim 10, wherein the sensor data is acquired by a sensor mounted on an end effector of the robot.

14. The one or more non-transitory computer-readable storage media of claim 10, wherein the machine learning model comprises a long short-term memory.

15. The one or more non-transitory computer-readable storage media of claim 14, wherein the machine learning model further comprises at least one of a fully-connected layer, a Q network, or a pi network.

16. The one or more non-transitory computer-readable storage media of claim 10, wherein during the reinforcement learning, the machine learning model is trained along with at least one other machine learning model in the environment, wherein the environment comprises a distributed environment.

17. The one or more non-transitory computer-readable storage media of claim 10, wherein during the reinforcement learning, a learner updates parameters of the machine learning model, and the learner further updates one or more priorities used to sample stored transitions that each comprises an observation, an action, and a reward and one or more priorities used to sample sequences that each comprise multiple transitions.

18. The one or more non-transitory computer-readable storage media of claim 10, wherein:
during the reinforcement learning, two last time sequences that comprise transitions in an episode of transitions overlap, and an amount of the overlap is based on a length of the episode; and
each transition included in the episode of transitions comprises an observation, an action, and a reward.

19. A system comprising:
one or more memories storing instructions; and
one or more processors that are coupled to the one or more memories and, when executing the instructions, are configured to:
receive sensor data associated with the robot, wherein the sensor data comprises at least one of force or torque data,
apply a machine learning model to the sensor data to generate an action, wherein the machine learning model is fully trained via reinforcement learning in an environment that does not include a model of the robot throughout a training process for the machine learning model, and
cause the robot to perform one or more movements based on the action.

* * * * *